Patented Nov. 1, 1932

1,885,934

UNITED STATES PATENT OFFICE

MAX MAYER, OF CARLSBAD, CZECHOSLOVAKIA, ASSIGNOR, BY MESNE ASSIGNMENTS, TO KREBS PIGMENT & COLOR CORPORATION, OF NEWARK, NEW JERSEY, A CORPORATION OF DELAWARE

ART OF PRODUCING OXIDES OF THE FOURTH GROUP METALS

No Drawing. Application filed March 14, 1929, Serial No. 347,192, and in Germany and Czechoslovakia March 15, 1928.

My invention pertains to the production of oxides of those metals of the fourth group of the periodic system of the elements which form fluid halogen compounds. It relates particularly to the production of titanium oxide. In the known processes generally products suitable for use can not be obtained but by calcination of the oxydic compounds intermediately isolated. The products obtained thereby however are generally unfit for use. Almost always products consisting of particles of fine even and homogeneous structure are required particularly if these oxides be used as a pigment in paints or as an opacifier in enamels. Difficulty has now been met with inasmuch as the calcination required tends to render the particles of the ultimate product coarse and unhomogeneous. Many attempts have been made to obtain the necessary homogeneity and fineness by grinding. But unless very expensive methods of grinding are applied the products do not show the desired qualities.

The present invention affords a way to overcome the difficulty encountered before. An important feature of my invention is to distribute a halogen compound of those metals of the fourth group which form fluid halogen compounds very evenly and finely in another body. The fineness and particularly the homogeneity of distribution so provided for is preserved upon decomposition and calcination. The oxides of the fourth group metals specified are thus obtained in the form of much more even and homogeneous particles than could be had heretofore unless mechanical means were employed. The product obtained according to the invention is fit for any use but particularly for use as a pigment or as an opacifier in frits of enamels.

In carrying out my invention I take a fluid halogen compound of a fourth group metal as for instance titanium. This compound I distribute in a salt. I prefer to do this by soaking the salt with the halogen compound. Thereupon I treat the mixture at elevated temperature with steam. The fourth group metal halogen compound is thereby decomposed under formation of its oxide. Subsequently I raise the temperature further and maintain the mass for some time above 800° C. e. g. at 950° C.

After allowing the mass to cool down to ordinary temperature I leach it, the oxide thus remaining after removal of the solution in a pure state and subdivided in particles complying in all regards with the above outlined requirements for use as a pigment or opacifier.

The salt to be mixed with the fluid fourth group metal halogen compound I choose so as to avoid any interaction thereof with any of the other substances introduced. Besides to provide for the final leaching I select a salt which is soluble in such solvents as will not dissolve the oxide of the fourth group metal.

I have found the chlorides or sulfates of alkali metals very suitable to meet the purpose.

To explain this invention in detail and to enable anyone to avail himself thereof the following example may be stated:

I run 100 kilograms of titanium chloride slowly into 200 or more kilograms of finely ground potassium sulfate. The potassium sulfate absorbs the $TiCl_4$. A plastic mass results. This mass is heated to 300° to 400° C. and treated at this temperature for about one hour with steam. The steam is then turned off and the temperature raised above 800° C. and maintained so for 15 to 30 minutes. Subsequently the mass is allowed to cool down to ordinary temperature. Water is thereupon added and the mass stirred until the potassium sulfate is dissolved. The solution is withdrawn and the $TiO_2$ washed out and dried.

This product is of more homogeneous structure than could be obtained before by usual processes. The size of the particles may still be reduced if desired by mechanical means.

The description and the example given above is not meant to confine my invention in any way. The scope of this invention comprises many modifications; be it pointed out for instance that the process may be employed as well for the production of silicium oxide, which is an oxide of metal of the fourth group which forms a fluid halide. Anyone skilled in the art will be able to modify the process described so as to answer best his particular requirements.

I claim:

1. In the manufacture of oxides of fourth group metals from fluid halogen compounds of such metals, the method which consists in incorporating said compounds in solid salt non-reactive on said oxides and decomposing said compounds by treating the mass with steam.

2. In the manufacture of oxides of fourth group metals from fluid halogen compounds of such metals, the method which consists in incorporating said compounds in a solid salt extractable by solvents non-reactive on said oxides, decomposing the halogen compounds by treating the mass with steam, calcining the mass and leaching it.

3. In the manufacture of oxides of fourth group metals from fluid halogen compounds of such metals, the method which consists in incorporating said compounds in a soluble salt extractable by solvents non-reactive on said oxides, decomposing the halogen compounds by treating the mass with steam, calcining the mass at a temperature above 800° C. and leaching it.

4. In the manufacture of oxides of fourth group metals from fluid halogen compounds of such metals, the method which consists in incorporating said compounds in a solid water-soluble salt non-reactive on said oxides, decomposing the halogen compounds by treating the mass with steam, calcining the mass at a temperature above 800° C., leaching it and separating the solution.

5. In the manufacture of oxides of fourth group metals from fluid halogen compounds of such metals, the method which consists in incorporating said compounds in a solid alkali metal salt, decomposing the halogen compounds by treating the mass with steam, calcining the mass and leaching it.

6. In the manufacture of titanium oxide from titanium chloride, the method which includes incorporating said chloride in a solid soluble salt, decomposing the chloride by treating the mass with steam, calcining the mass at temperatures above 800° C., leaching the product and separating solids from the liquid.

7. In the manufacture of titanium oxide from titanium chloride, the method which includes incorporating said chloride in a solid salt extractable by water, decomposing the chloride by treating the mass with steam, calcining the mass at a temperature above 800° C. to 1000° C., leaching the product with water and separating the solids from the solution.

8. In the manufacture of titanium oxide from titanium chloride, the method which includes incorporating said chloride in alkali metal sulphate, decomposing the chloride by treating the mass with steam, calcining the mass at temperatures above 800° C., leaching the product and separating solids from the liquid.

9. In the manufacture of titanium oxide from titanium chloride, the method which includes incorporating said chloride in alkali metal sulphate to form a plastic mass, heating the mass to 300° to 400° C., maintaining said temperature and steaming the mass for about one hour, heating the steamed mass to above 800° C., maintaining the temperature for about 15 to 30 minutes, cooling the product to normal temperature, adding water, withdrawing water and dissolved sulphate, washing and drying the titanium oxide.

In testimony whereof I affix my signature.

MAX MAYER.